United States Patent
Asano et al.

(10) Patent No.: US 7,203,780 B2
(45) Date of Patent: Apr. 10, 2007

(54) SYSTEM AND METHOD FOR FACILITATING COMMUNICATION BETWEEN DEVICES ON A BUS USING TAGS

(75) Inventors: Shigehiro Asano, Austin, TX (US); Tsutomu Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 11/063,174

(22) Filed: Feb. 22, 2005

(65) Prior Publication Data

US 2006/0190647 A1   Aug. 24, 2006

(51) Int. Cl.
*G00F 13/00* (2006.01)
(52) U.S. Cl. ..................................... 710/110
(58) Field of Classification Search ............... 710/110; 711/202
See application file for complete search history.

(56) References Cited

U.S. PATENT DOCUMENTS

| | | | | |
|---|---|---|---|---|
| 5,784,590 A | * | 7/1998 | Cohen et al. ............. | 711/122 |
| 5,897,656 A | * | 4/1999 | Vogt et al. ............... | 711/141 |
| 6,014,734 A | * | 1/2000 | Tran et al. ............... | 712/23 |
| 6,112,019 A | * | 8/2000 | Chamdani et al. ........ | 712/214 |
| 6,240,479 B1 | | 5/2001 | Snyder et al. | |
| 6,360,308 B1 | * | 3/2002 | Fechser ................... | 711/218 |
| 6,490,642 B1 | * | 12/2002 | Thekkath et al. ......... | 710/110 |
| 6,493,776 B1 | * | 12/2002 | Courtright et al. ....... | 710/110 |
| 7,127,562 B2 | * | 10/2006 | Dieffenderfer et al. ... | 711/146 |

* cited by examiner

*Primary Examiner*—Paul R. Myers
(74) *Attorney, Agent, or Firm*—Law Offices of Mark L. Berrier (57) ABSTRACT

Systems and methods for enabling a slave device to generate a tag that is an index into a buffer where the slave device stores information related to an active transaction such as a write command received by a master device. The tag is sent to the master device with a reply (such as a response to a write command received from the master device), the master device returns the tag with the data to be written to the slave device. The slave device can efficiently associate the received data with the previously sent write command by retrieving the command from the buffer using the tag as an index into the buffer. Additional hardware such as a content-addressable memory unit is not required to make the association.

19 Claims, 8 Drawing Sheets

SYSTEM AND METHOD FOR FACILITATING COMMUNICATION BETWEEN DEVICES ON A BUS USING TAGS

BACKGROUND OF THE INVENTION

1. Field of the Invention

The invention relates generally to systems and methods for facilitating communication on a bus between master and slave devices. More particularly, the invention relates to systems and methods for facilitating write and read transactions between master devices and slave devices for the transferring of data between the devices.

2. Related Art

Many of today's high-performance systems include multiple processors that share the computation load. In many multiple processor systems, some of the processors are set up as master devices and some of the processors are set up as slave devices. The master devices typically control the slave devices by sending data to and reading data from the slave devices through write and read commands. Communication between master and slave devices in such systems is typically accomplished with one or more busses. Busses have limited bandwidth that must be shared by all the devices on the bus, and thus, the implemented communication scheme over the busses should be as efficient as possible.

The transactions that are associated with each of the commands generated by a master device to facilitate data transfers typically require more than one phase or step to complete. For example, a write transaction requires the issuance of a write command, a determination by the master device whether the slave device can accept the command, and the sending of data to be written to the slave device when the slave device indicates that it can accept the data. To increase the communication efficiency, multiple transactions may be in progress concurrently. That is, after a first command is generated by a master device and while execution of that command is still in progress, one or more additional commands may be generated by the master device or by other master devices.

A scheme is thus required to facilitate the association of the different phases of a transaction with each other, since multiple transactions may be in progress concurrently. One such scheme involves the tagging of each communication with an identifier, or tag, that is unique to each transaction. In a tagging scheme, when a command is generated by a master device, the command and a tag associated with the command are stored in a buffer. The tag is used to identify the command in the buffer until the transaction associated with the command is complete. The tag is communicated with the command to the slave devices and the slave devices communicate the tag back to the master device with the replies sent to the master devices. When the master device receives a reply, the master device can determine the transaction with which the communication is associated by using the tag to identify the associated command in the buffer.

Because a master device assigns the tags to the commands in the buffer, the tags can be assigned in a way that minimizes the cost associated with using the tags to look up entries in the buffer. In particular, the tags can be assigned in such a way that they correspond to the physical locations of the corresponding commands in the buffer. For example, tag 1 may correspond to the first location in the buffer, tag 2 may correspond to the second location in the buffer, and so on. The tags can then be used to index into the buffer rather than having to compare them to each of the tags stored in the buffer to determine the location of the corresponding commands.

Slave devices can also use the tag generated by the master device as a way to associate phases of a transaction with each other. In the case of the slave devices, however, the tag is not an index into the buffer where information about the transactions in progress is stored. Slave devices can store the master tag and perhaps other information about the transactions in a buffer having a separate index. A content-addressable memory unit is thus typically required to associate incoming communications with previously received communications. A content-addressable memory unit can search through the contents in its memory to determine which, if any, of the entries stored in the memory (commands with previously received tags) match a specific value (the current tag). Content-addressable memory units require more time to retrieve an entry compared to an indexed buffer, since a content-addressable memory unit must compare the current tag to the contents of each location in the content-addressable memory each time an entry is to be retrieved. In addition, content-addressable memory units require more logic than indexed buffers, thus requiring more physical space on an integrated circuit thereby and increasing the cost of manufacturing.

Because of the cost, access time, circuitry, chip space, etc. associated with content-addressable memories, it would be desirable to provide a tag scheme that allows slave devices to more efficiently associate incoming communications with previously received communications.

SUMMARY OF THE INVENTION

One or more of the problems outlined above may be solved by the various embodiments of the invention. Broadly speaking, the invention includes systems and methods that enable a slave device to generate a new tag that is an index into a buffer where the slave device stores information related to an active transaction such as a transaction associated with a write command received by a master device. For example, after receiving a write command from a master device, the slave device sends an availability response to the master device along with a master-generated tag that was received with the write command and the new slave-generated tag. When the master sends write data back to the slave, the slave-generated tag is included with the write data. The slave device then retrieves the information associated with the transaction by indexing into the buffer according to the slave-generated tag. The comparison hardware of a content-addressable memory unit is not required to make the association.

In one embodiment, a first communication from a master device is received by a slave device. The first communication may be, for example, a write command with which the master device can write data to the slave device. The slave device is configured to save the received command in a command buffer with a slave-generated tag, which is an index into the slave's command buffer. The slave-generated tag is selected from a list containing information indicating which tags are available (corresponding to those locations in the buffer that are not being used to store other commands at the time).

The slave device is configured to send a reply to the master device to indicate to the master device whether the slave device is available to accept the write command. The slave device may reply, for example, with an acknowledgement indicating that the slave device is available to accept data or with a retry indicating that the master device should send the write command again at a later time. If the reply is an acknowledgement, the reply includes the master-generated tag that was received with the command (so that the master device can index into its own buffer to retrieve the associated command,) as well as the slave-generated tag.

The master device is then configured to send a second communication to the slave device. In one embodiment, the second communication includes the data to be written to the slave device and a d-tag with which the slave device can identify the data. In one embodiment, the d-tag sent with the data is the s-tag that the master device received with the slave device's reply to the original write command.

When the slave device receives the second communication from the master device that is associated with the previously received command (e.g., write data,) the slave device associates the second communication with the command by identifying the slave-generated tag in the second communication and by using the slave-generated tag to index into the slave device's command buffer to retrieve the command. The slave device may then complete the transaction associated with the command (e.g., it may store received data at an address indicated by a retrieved write command.)

The various embodiments of the present invention may provide a number of advantages over the prior art. For example, with respect to the embodiment described above, the need for a content-addressable memory unit in the slave device. Similar advantages may be provided in other embodiments involving other types of devices.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment that is described. This disclosure is instead intended to cover all modifications, equivalents, and alternatives falling within the scope of the present invention as defined by the appended claims.

DETAILED DESCRIPTION OF EXEMPLARY EMBODIMENTS

One or more preferred embodiments of the invention are described below. It should be noted that these and any other embodiments described below are exemplary and are intended to be illustrative of the invention rather than limiting.

Broadly speaking, the invention includes systems and methods in which a slave device generates a tag that is an index into a buffer where the slave device stores information related to an active transaction. For example, after receiving a write command from a master device, the slave device sends the generated tag to the master device along with an availability response, the master device returns the tag with the data to be written to the slave device, and the slave device retrieves the information associated with the transaction by indexing into the buffer according to the tag. Hardware associated with a content-addressable memory unit is not required to make the association.

While the invention is widely applicable to different types of systems, it is impossible to include all of the possible embodiments and contexts of the invention in this disclosure. The present disclosure therefore focuses on a few exemplary embodiments. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

In one embodiment, a first communication from a master device is received by a slave device. The first communication may be, for example, a write command with which the master device can write data to the slave device. The slave device is configured to save the received command in a command buffer with a slave-generated tag, which is an index into the slave's command buffer. The slave-generated tag is selected from a list containing information indicating which tags are available (corresponding to those locations in the buffer that are not being used to store other commands at the time).

The slave device is configured to send a reply to the master device to indicate to the master device whether the slave device is available to accept the write command. The slave device may reply, for example, with an acknowledgement indicating that the slave device is available to accept data or with a retry indicating that the master device should send the write command again at a later time. If the reply is an acknowledgement, the reply includes the master-generated tag that was received with the command (so that the master device can index into its own buffer to retrieve the associated command,) as well as the slave-generated tag.

The master device is then configured to send a second communication to the slave device. In one embodiment, the second communication includes the data to be written to the slave device and a d-tag with which the slave device can identify the data. In one embodiment, the d-tag sent with the data is the s-tag that the master device received with the slave device's reply to the original write command.

When the slave device receives the second communication from the master device that is associated with the previously received command (e.g., write data,) the slave device associates the second communication with the command by identifying the slave-generated tag in the second communication and by using the slave-generated tag to index into the slave device's command buffer to retrieve the command. The slave device may then complete the transaction associated with the command (e.g., it may store received data at an address indicated by a retrieved write command.)

With respect to the embodiment described above, the need for a content-addressable memory unit in the slave device is eliminated by selecting a tag that is an index into the command buffer where the slave device stores relevant information about transactions that are currently in progress. The information may be retrieved by identifying the tag in received communications and using the tag to index into the buffer. Similar advantages may be provided in other embodiments involving other types of devices.

Figure 1:
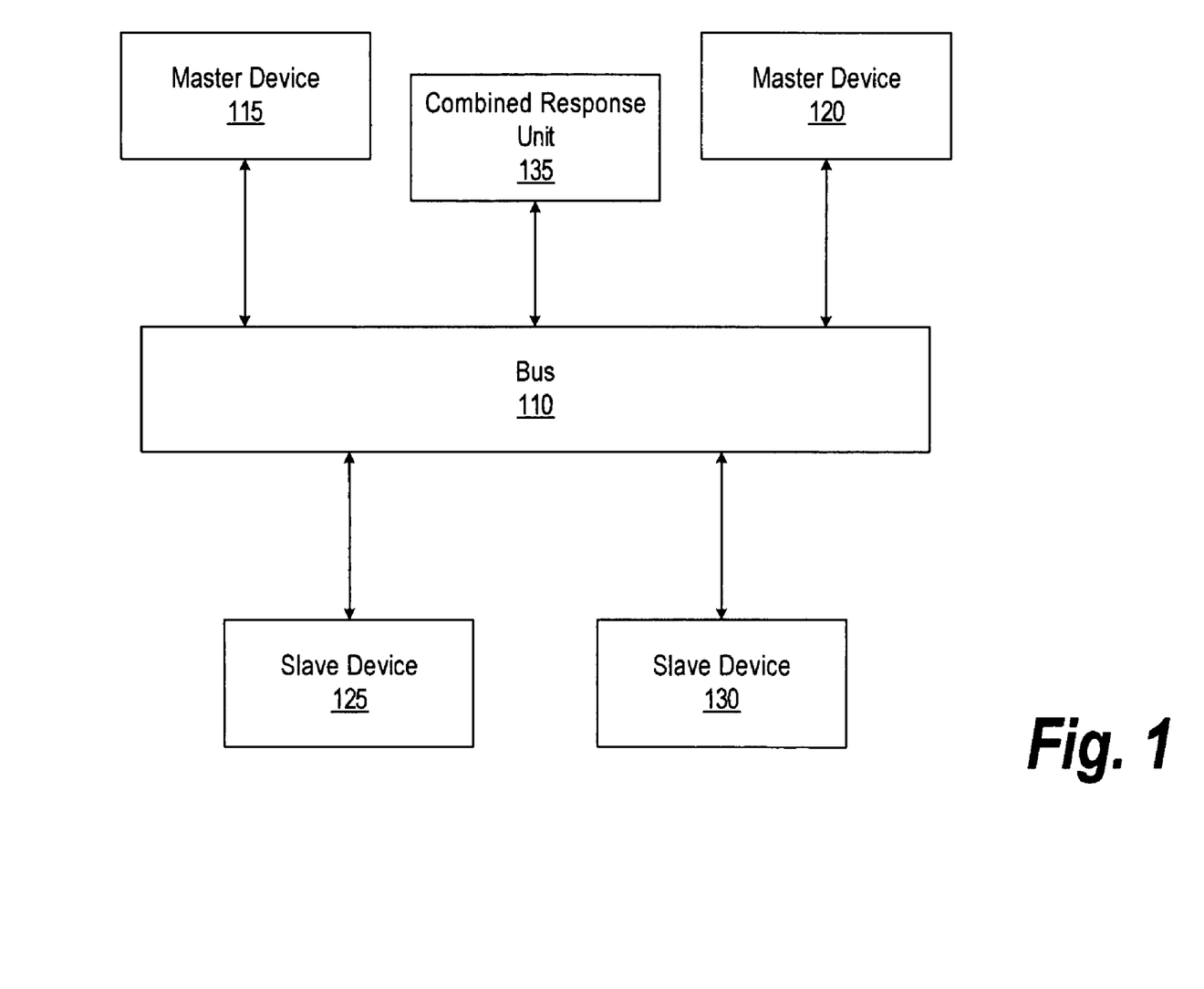
FIG. 1 is a block diagram illustrating a system having a bus that interconnects multiple master devices and slave devices in accordance with one embodiment.

Referring to FIG. 1, a block diagram illustrating a system having a bus that interconnects multiple master devices and slave devices in accordance with one embodiment is shown. In this embodiment, the master and slave devices are configured to interact to perform various transactions. For example, one of master device 115 and master device 120 may generate a write or a read command to one of slave devices 125 and 130. The master device may then send data to or receive data from the slave device. Slave devices 125 and 130 are configured to each send a reply after receiving the command. The reply can be an acknowledgment, a retry, or a null reply. An acknowledgment indicates that the slave device can accept or send data, a null indicates that the slave is not a participant in the transaction, and a retry indicates that the requested transaction cannot be completed at that time and that the master device needs to retry sending the command at a later time.

Combined response unit 135 is configured to receive the replies from all of the slave devices, combine the replies, and broadcast a single, combined reply to all of the devices connected to the bus (including master devices and slave devices.) In one embodiment, combined response unit 135 is configured to broadcast a retry combined response if the reply from one or more of the slave devices is a retry. The retry reply may be generated by a slave device that is a direct participant in the transaction (e.g., the device to which data is written or from which data is read,) or by a slave device that is an indirect participant (e.g., a device that observes the transaction and updates locally stored information based upon the transaction.) In either case, the device is not ready for the transaction to proceed, so a retry reply is generated to delay the transaction.

In one embodiment, read and write transactions comprise multiple phases or steps. A write transaction, for example, may include, among others, phases where: a master device generates a write command; the master device sends the command to a slave device; the slave device determines whether it can accept the command; the slave device sends to the master device a response indicating whether the slave device can accept the command; the master device, in response to receiving an acknowledgement from the slave device, retrieves the data to be sent to the slave device from its local storage; the master device sends the data to the slave device; the slave device receives the data; and the slave device stores the data in its local storage.

Similarly, a read transaction may include, among others, phases where: a master device generates a read command; the master device sends the command to a slave device; the slave device determines whether it can accept the command; the slave device sends to the master device a response indicating whether the slave device can accept the command; the slave device sends the data to the master device; and the master device receives the data.

In one embodiment, a tag scheme may be used to associate the different phases of each transaction with each other. After generating a write or read command, for example, a master device is configured to generate a master tag (m-tag) that is associated with the generated command. The m-tag is sent to a slave device with the command and is then returned to the master device with any replies or data sent by the slave device. Using the returned m-tag, the master device can associate the received responses or data with the appropriate transaction. In one embodiment, the m-tag may be an index into a command buffer in the master device where information about the transaction (such as the originally generated command) is kept. By using the m-tag as an index, information about the transaction can be quickly retrieved.

The slave devices are configured to receive commands and m-tags from the master devices. In one embodiment, the slave devices are configured to generate slave tags (s-tags) for associating the different phases of transaction with each other. The slave devices are configured to include the s-tag with some of the responses the slave devices send to other devices (such as master devices and combined response units) so that these other devices can return the s-tag to the slave device with data, subsequent communications, etc. which the other devices send to the slave devices. The s-tag is an index into a command buffer in each slave device where the slave device stores information about the transaction. By using the s-tag as an index, information about the transaction can be quickly retrieved by the slave device without the use of hardware such as a content-addressable memory unit.

Figure 2:
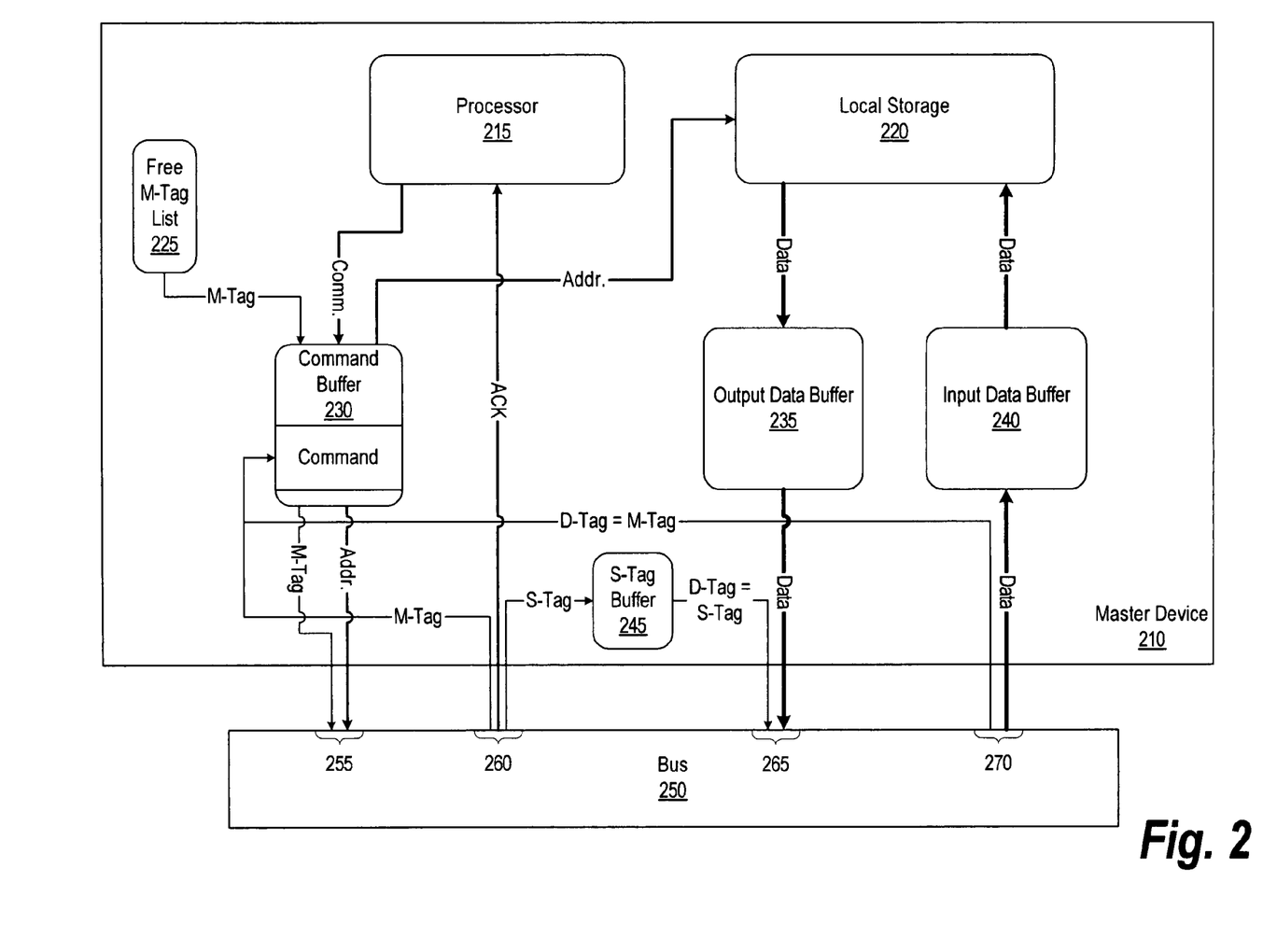
FIG. 2 is a block diagram illustrating a master device configured to generate write and read commands in order to send data to and receive data from slave devices through a bus using a tag scheme in accordance with one embodiment.

Referring to FIG. 2, a block diagram illustrating the structure of a master device configured to perform transactions using a tag scheme in accordance with one embodiment is shown. Master device 210 is configured to generate write commands in order to transfer data from local storage 220 to a slave device over bus 250. Master device 210 is also configured to generate read commands in order to transfer data from a slave device over bus 250 to local storage 220.

In one embodiment, master device 210 generates a write command and stores the command in command buffer 230. The command may be stored with various relevant information, such as the address in local storage 220 where the data is currently stored and the address in the local storage of the slave device where the data is to be written. The command is stored in command buffer 230 until the transaction associated with that command is complete. To store the command, an m-tag is obtained from free m-tag list 225 that contains information indicating which of the m-tags are available. A particular m-tag is available if a corresponding storage location in the command buffer is available. The m-tag is used as an index into command buffer 230 where the command is stored. For example, tag 1 may correspond to the first location in the buffer, tag 2 may correspond to the second location in the buffer, and so on.

The command and the selected m-tags are then sent to the bus through lines 255. The command can be seen, not only by the slave device to which the data is to be written, but also by the other devices connected to the bus. Master device 210 sends the command prior to sending the data to be written in order to ensure that the target slave device and any other devices that are indirect participants in the transaction are ready for the transaction to proceed. If all of the devices are ready for the transaction to proceed (e.g., if the target slave device can accept the write command,) the master device can proceed to send the data.

Master device 210 is configured to receive a reply from a slave device through lines 260 in response to the write command that was previously sent to the slave device. In one embodiment, the reply contains the m-tag that the master device originally sent to the slave device, an s-tag assigned to the transaction by the slave device, and a response indicating that the slave device is available to receive data from the master device. The received s-tag is stored in s-tag buffer 245 so that it can be returned with the data that is to be written to the slave device. The m-tag is used as an index into command buffer 230 to locate and retrieve the command corresponding to the received response. After the command is located, the command is retrieved and removed from buffer 230 and the address stored with the command is sent to the master device's local storage 220 so that data at that address can be retrieved. Data from that particular address in the master device's local storage 220 is sent to output buffer 235 where the data enters a queue to exit master device 210. After the data reaches the "top" of output buffer 235, the data is sent to the slave device, together with the corresponding s-tag, which is retrieved from s-tag buffer 245. The s-tag and the data are sent to the appropriate slave device through lines 265. This completes the transaction associated with the write command, with respect to the master device.

Master device 210 is also configured to generate read commands with which master device 210 can retrieve data from slave devices over bus 250. In one embodiment, when processor 215 generates a read command, an available m-tag is again obtained from free m-tag list 225. The m-tag is an index into command buffer 230. The command is stored in command buffer 230 at the location indexed by the m-tag until the transaction associated with the read command is complete. The command and the selected m-tag are then sent, through lines 255, to the slave device from which the data is to be read over bus 250. Prior to requesting the data, master device 210 determines whether the slave device is available to send the data.

If the slave device is available to send the data, the data is sent by the slave device and is received by master device 210 through lines 270. In addition to the data, the slave device sends the m-tag. The m-tag is used by master device 210 to index into buffer 230 to locate the command corresponding to the received data. When the command is located, the command is retrieved from buffer 230 and the address stored with the command is sent to the master device's local storage 220 so that the received data can be stored at that address. The received data is first sent to input buffer 240 and then to the master device's local storage 220. In one embodiment, this completes the transaction associated with the read command.

Figure 3:
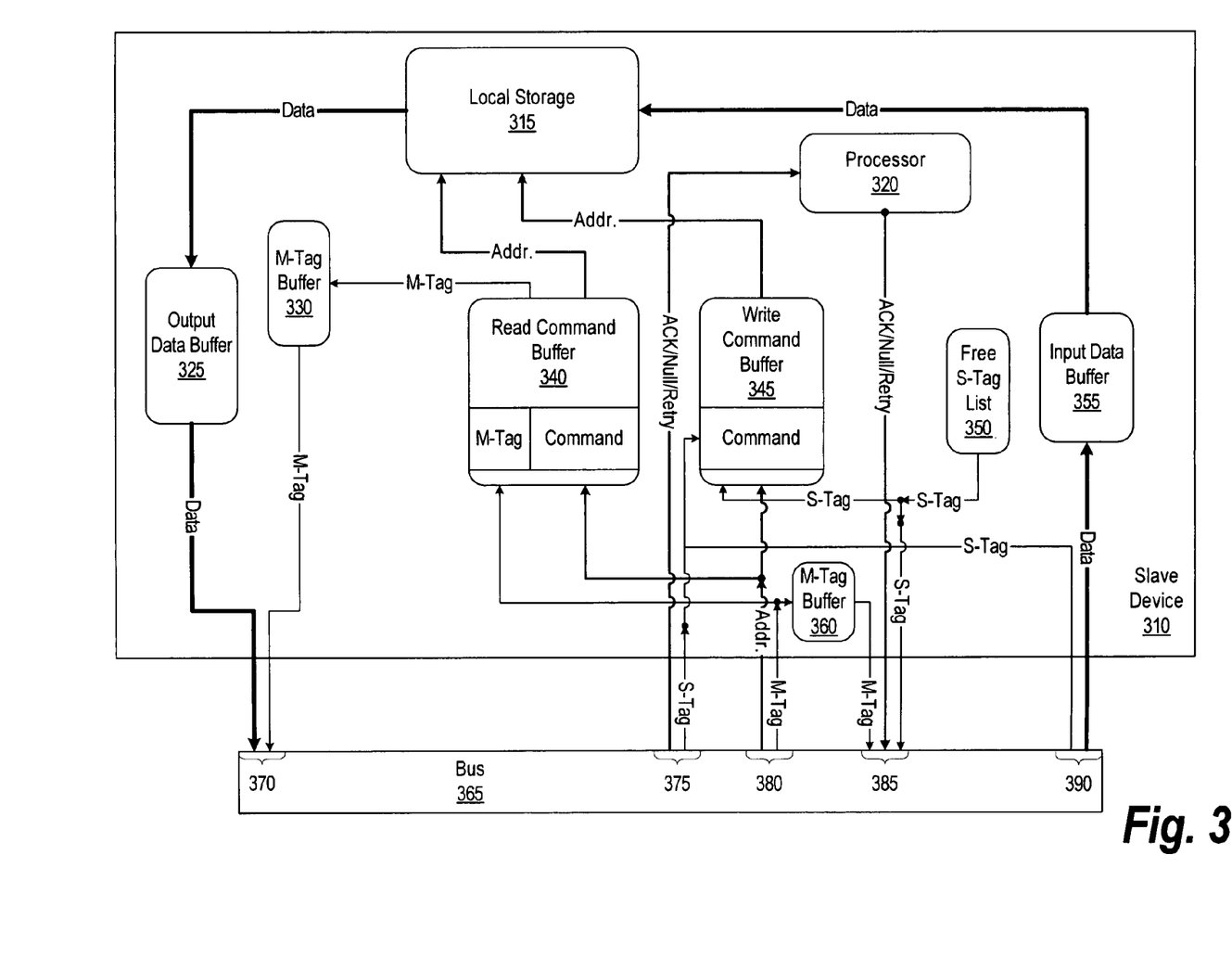
FIG. 3 is a block diagram illustrating a slave device configured to receive and send instructions and data from and to master devices over a bus using a tag scheme in accordance with one embodiment.

Referring to FIG. 3, a block diagram illustrating a slave device configured to receive data from and send data to master devices through a bus in accordance with one embodiment is shown. Slave device 310 is configured to receive write and read commands in order to receive and store data from a master device over bus 365 or to retrieve and send data to a master device over bus 365.

In one embodiment, slave device 310 is configured to receive through lines 375 a write command/address and an m-tag assigned by the master device to identify the transaction. Slave device 310 is configured to determine whether write command buffer 345 is full. If the buffer is full, slave device 310 sends the master device a retry reply indicating to the master device that the slave device cannot accept the command. The retry response also contains the m-tag received with the command so that the master device can associate the reply with the write command and schedule the command to be sent to the slave device at a later time.

If the slave device 310 is able to accept the write command, slave device 310 is configured to store the command in write command buffer 345. Slave device 310 retrieves an s-tag from a free s-tag list 350 that contains information indicating which s-tags (and corresponding locations in buffer 345) are available. The write command is stored in write command buffer 345 using the assigned s-tag value as an index into the write buffer. After slave device 310 stores the write command, the slave device is configured to send an acknowledgment reply to the master device indicating that the slave device is ready to accept the data that is to be written to the slave device. The acknowledgment reply contains the received m-tag and the s-tag that was assigned to the transaction by the slave device. The master device is configured to return to the slave device the data to be written to the slave device, along with the s-tag so that the slave device can associate the data with the previously received write command.

In one embodiment, a combined response unit that is also connected to bus 365 is configured to receive the responses to a master device's write command from all the slave devices, determine a combined response based on the individual slave devices' responses, and broadcast the combined response to the slave devices and to the master device. In one embodiment, if one slave device replies with an acknowledgment and the other slave devices respond with a null, the combined response unit is configured to send an acknowledgment combined response. If, however, one of the slave devices sends a retry response, the combined reply unit is configured to broadcast a retry response to the slave devices and to the master device.

In one embodiment, slave device 310 is configured to receive a combined response that includes the response type and the s-tag assigned to the transaction by the slave device through lines 375. If the combined response is a retry, slave device 310 is configured to locate using the received s-tag as an index into the write buffer and remove the write command corresponding to the retry response from write buffer 345. The write command is removed from write buffer 345 to prevent the storage into the buffer of two identical write commands. The master device also receives the combined retry response and thus will resend the write command to the slave device.

Slave device 310 may receive the data and the associated tag (s-tag) from the master device through lines 390. The received data is placed in input buffer 355. Using the s-tag as an index into write buffer 345, slave device 310 retrieves the corresponding command from write buffer 345. Slave device 310 provides the write information corresponding to the command (e.g., which the address to which the received data is to be written) to local storage 315. The stored in input buffer 355 is then sent to local storage 315 and stored at the address retrieved from write command buffer 345.

In an alternative embodiment, slave device 310 is configured to receive read commands from a master device, through which the master device can read data from local storage 315. Slave device 310 is configured to receive a read command and the m-tag sent by a master device through lines 380. Slave device 310 is configured to determine whether read command buffer 340 can accept the received read command. If the read command buffer 340 is full, for example, slave device 310 is configured to send to the master device a retry reply.

On the other hand, if the slave device's read buffer is not full, the received read command, which includes the read address from which data is to be read and sent to the master device, is stored in the read command buffer 340 with the m-tag corresponding to the command. When the read command reaches the "top" of read buffer 340 the command/address is sent to local storage 315 so that the data to be sent to the master device can be retrieved from the particular address. The corresponding m-tag is sent to m-tag buffer 330. After the data is retrieved from local storage 315, the data is sent to output buffer 325. The data and the corresponding m-tag stored in m-tag buffer 330 are then sent through lines 370 and over bus 365 to the master device that requested the data.

In an alternative embodiment, a device on the bus may be both a master device and a slave device (master/slave device). In this embodiment, an additional identifier (e.g., a bit or bits) may included with the m-tag and the s-tag in order to indicate to a master/slave device receiving data whether the received data is intended for the master or slave portion of the device. For example, a 01 prefix may be assigned to m-tags and a 10 prefix may be assigned to s-tags. By examining a tag's prefix, a master/slave device can appropriately direct any data received with the tag to the master portion or to the slave portion of the device. The tags may again be used to associate different phases of a transaction with each other.

Figure 4:
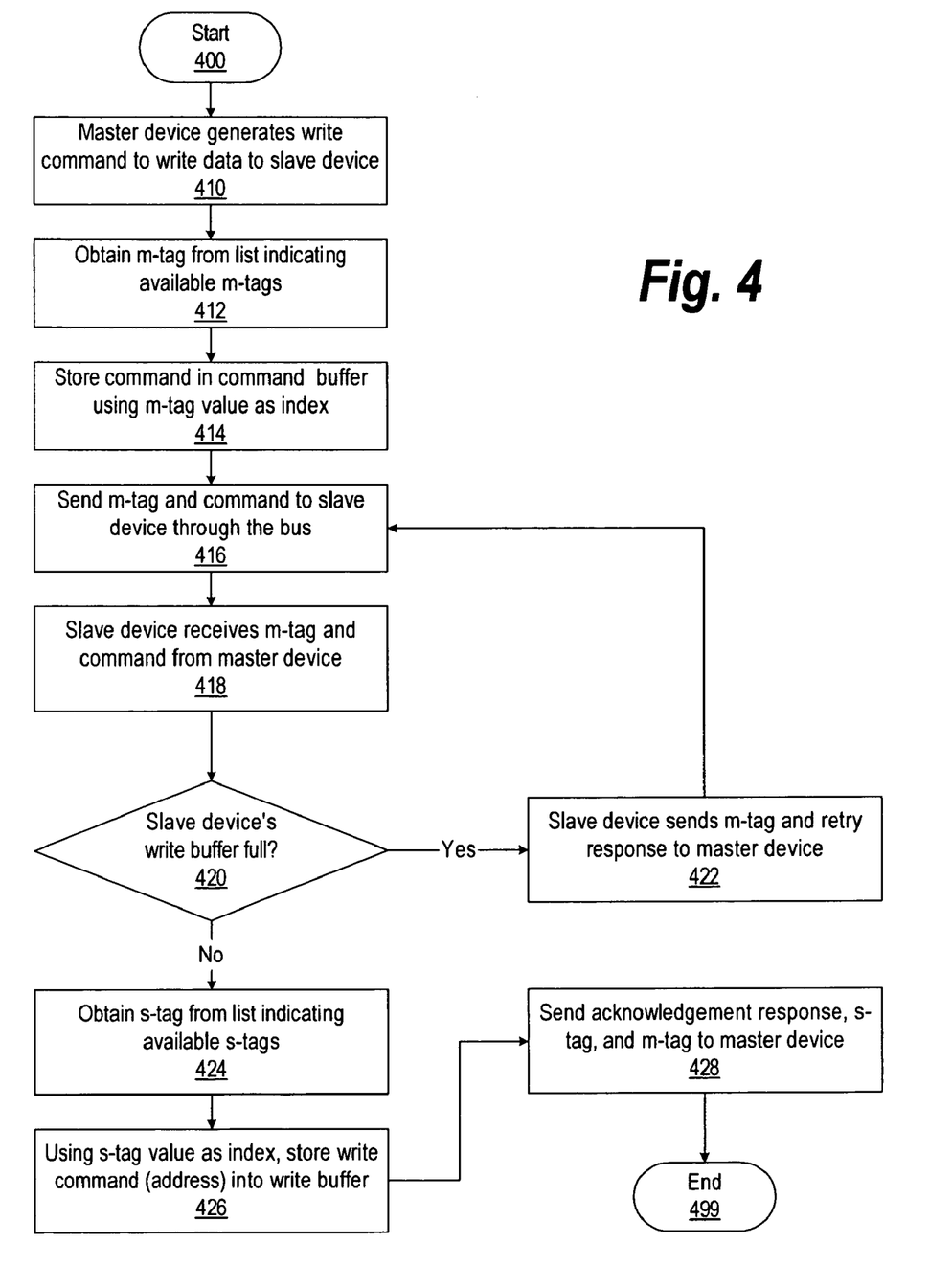
FIG. 4 is a flowchart illustrating a method by which a master device sends a write command to a slave device in accordance with one embodiment.

Referring to FIG. 4, a flowchart illustrating a method by which a master device sends a write command to a slave device in accordance with one embodiment is shown. Processing begins at 400 whereupon, at block 410, the master device generates a write command. The master device uses the write command, which includes a destination address, to transfer data from the master device's local storage to the local storage of the slave device. At block 412, an m-tag is obtained from a list that contains information indicating which of the m-tags are available. The m-tag is used as an index into the command buffer where the command is stored while the command is being processed. The command is removed from the buffer when the processing of the command is complete. At block 414, the command is stored in the command buffer using the m-tag value as an index, and at block 416, the command and the selected m-tag are sent to the slave device to which the data is to be written.

At block 418, the slave device receives the m-tag and the command sent by the master device. The slave device is configured to determine whether the slave device's write buffer is full at decision 420. If the buffer is full, decision 420 branches to the "yes" branch whereupon, at block 420, the slave device sends to the master device a retry response that also contains the received m-tag. The master device can use the m-tag to match the received response to previously sent command so that the master device can resend the command at a later time. The slave device sends the retry response to indicate to the master device that the slave device is not currently available to accept the command sent by the master device.

On the other hand, if the slave device's write buffer is not full, decision 420 branches to the "no" branch whereupon, at block 424, an s-tag is obtained from a list containing information on which s-tags are available, and at block 426, the received command, which includes the write address, is stored in the write buffer using the available s-tag value as an index into the write buffer. The slave device uses the s-tag as an index to store the command so that a content-addressable memory will not be required to recover the command from the write buffer at a later time. The master device is configured to send to the master device the s-tag with the data, and the slave device is configured to use the s-tag to match the received data to the previously received command. The address contained in the command is the address where the slave device stores the data in the slave device's local storage. After the slave device successfully receives the write command from the master device, the slave device, at block 428, sends an acknowledgment response to the master device. In one embodiment, the acknowledgment response also contains the received m-tag and the slave device-assigned s-tag. The m-tag is used by the master device to match the response to the previously sent command so that the master device can send the appropriate data to the slave device.

Figure 5:
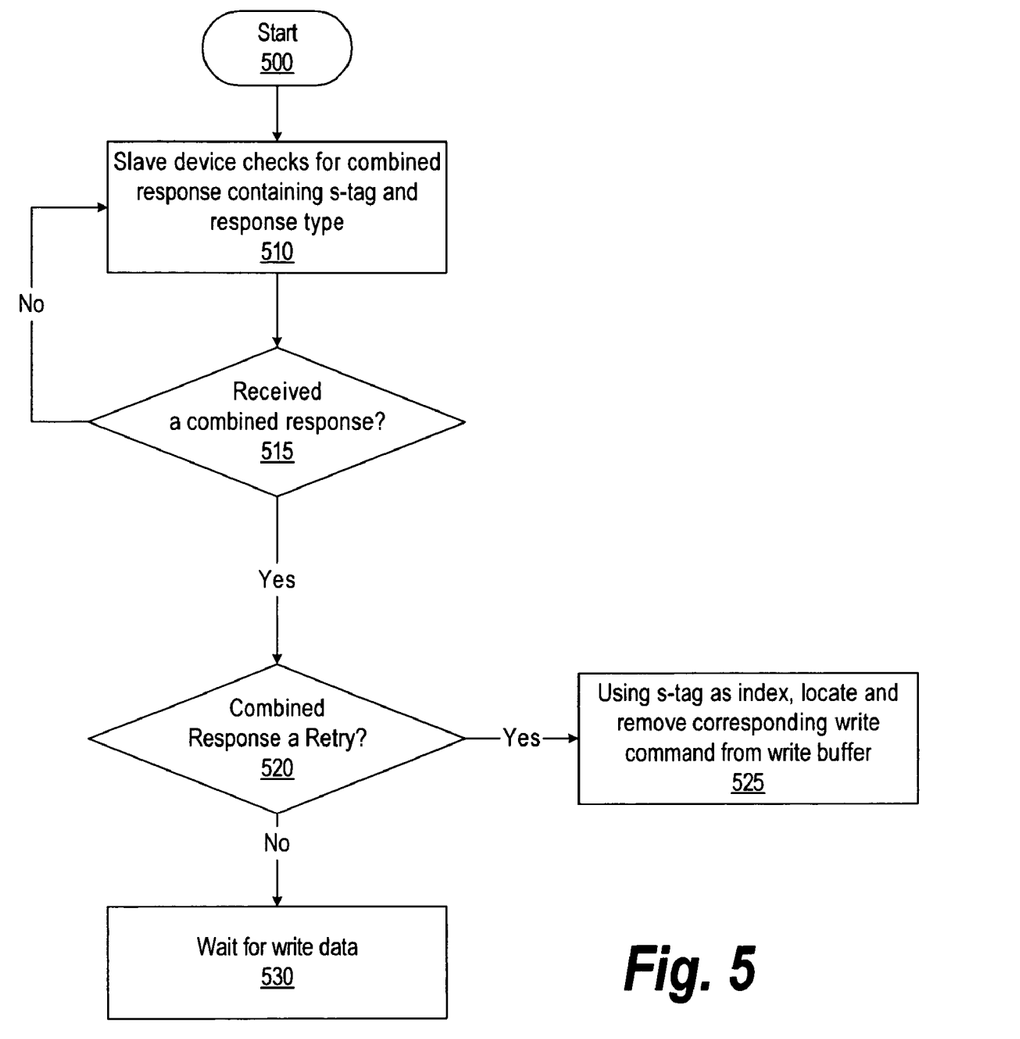
FIG. 5 is a flowchart illustrating a method by which a slave device processes a combined write response received from a combined response unit in accordance with one embodiment.

Referring to FIG. 5, a flowchart illustrating a method by which a slave device processes a combined write response received from a combined response unit in accordance with one embodiment is shown. Processing begins at 500 whereupon, at block 510, the slave device is waiting for a combined response to be received from a combined response unit. In this embodiment, it is assumed that the slave device has already sent to the bus an acknowledgment response to a master device's write command.

A determination is then made as to whether the slave device has received a combined response from the combined response unit. If a combined response has not been received, decision 515 branches to the "no" branch whereupon processing loops back to block 510 where the slave device continues to wait for a combined response to be received. If a combined response was not received, decision 515 branches to the "yes" branch whereupon, at decision 520, another determination is made as to whether the combined response was a retry. If the combined response was not a retry, decision 520 branches to the "no" branch whereupon the slave device waits to receive the write data at block 530.

If, on the other hand, the combined response was a retry, decision 520 branches to the "yes" branch whereupon, at block 525, using the received s-tag as an index into the write buffer, the write command corresponding to the retry response is located and is removed from the write buffer. The write command is removed from the write buffer to prevent the storage in the buffer of two identical write commands. The master device also receives the combined retry response and will thus resend the original write command at a later time.

Figure 6:
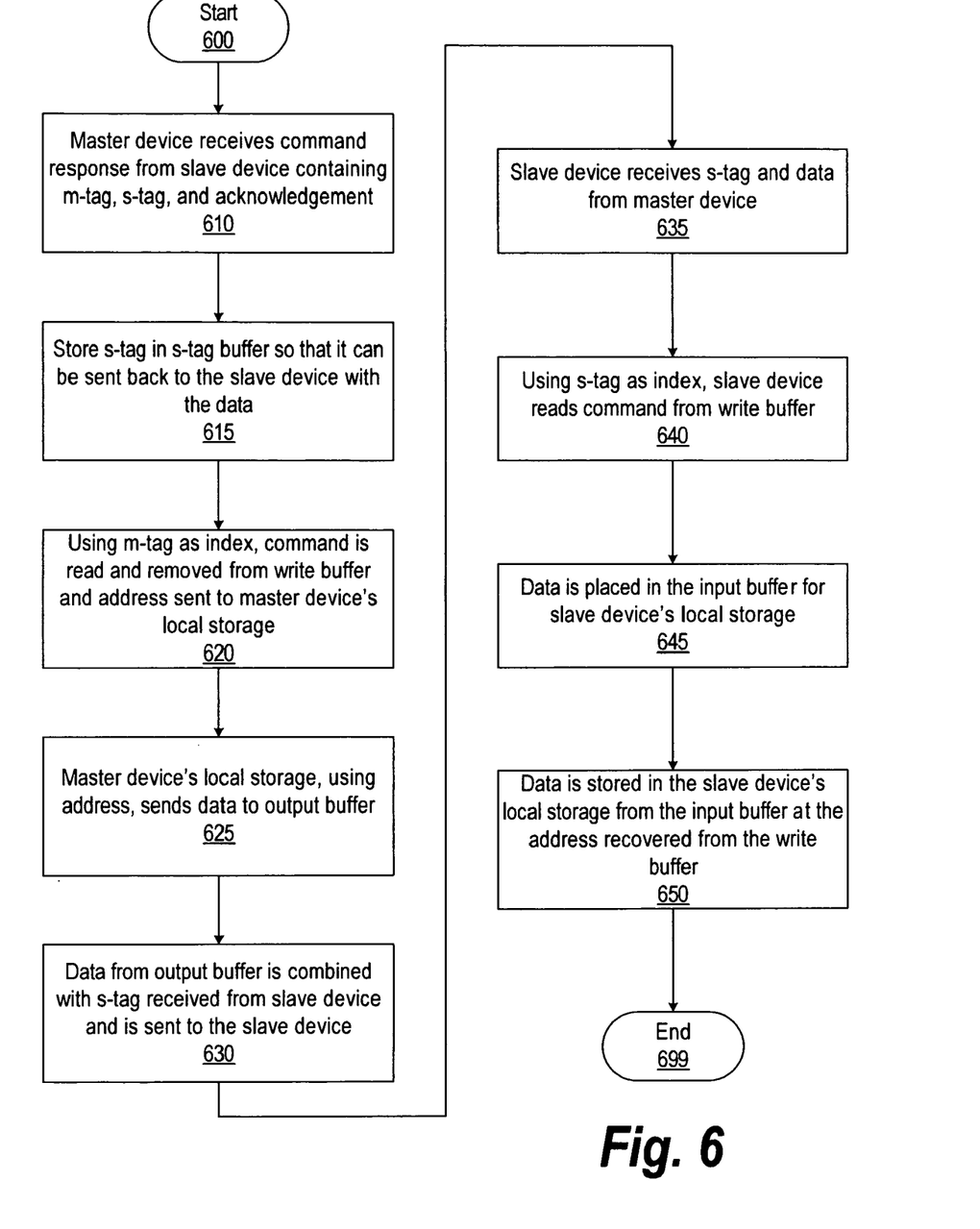
FIG. 6 is a flowchart illustrating a method by which a master device writes data to a slave device in accordance with one embodiment.

Referring to FIG. 6, a flowchart illustrating a method by which a master device transfers write data to a slave device in accordance with one embodiment is shown. Processing begins at 600 whereupon, the master device receives from a slave device a response to a write command previously sent to the slave device by the master device at block 610. In one embodiment, the response contains an m-tag that the master device had originally sent to the slave device with the write command, an s-tag assigned to the transaction by the slave device, and an acknowledgment indicating that the slave device is ready to receive data from the master device. At block 615, the received s-tag is stored in a temporary s-tag buffer so that it can be returned with the data to be written to the slave device. The m-tag is used as an index to locate the command corresponding to the received response in the master device's command buffer at block 620. When the command is located, the command is removed from the buffer and the address stored with the command is sent to the master device's local storage so that data at that address can be retrieved. At block 625, data from the particular address of the master device's local storage is sent to the output buffer, and at block 630, the master device sends the data from the output buffer with the corresponding s-tag to the appropriate slave device over the bus.

At block 635, the slave device receives the s-tag and the data from the master device, and at block 640, using the s-tag as index into the write buffer, the slave device reads the corresponding command previously stored in the write buffer. The corresponding command contains the address to which the received data is to be written. At block 645, the received data is placed in the input buffer, and at block 650, the data is sent to the slave device's local storage for storage. At 699, the process of writing data from the master device to the slave device is completed.

Figure 7:
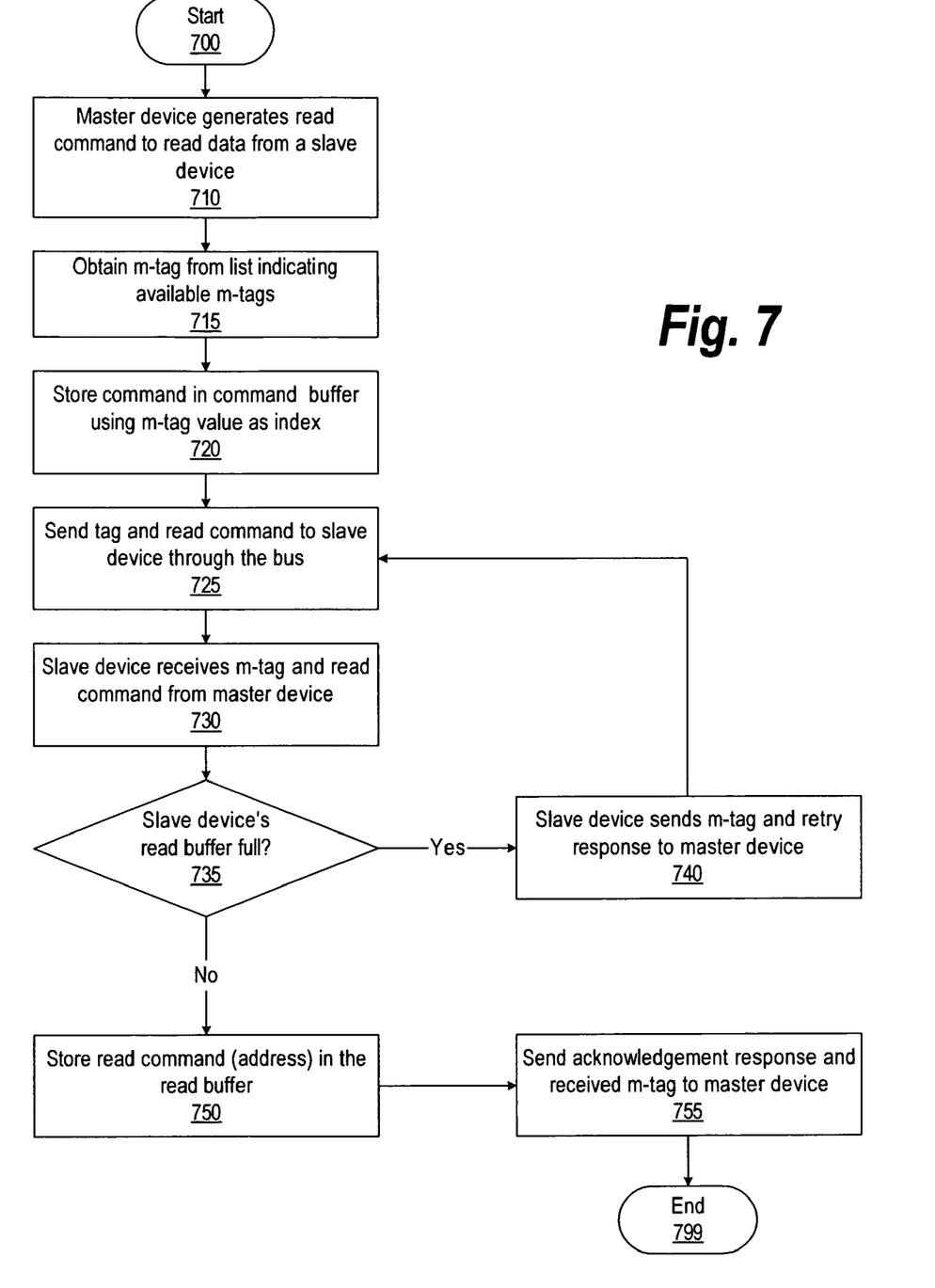
FIG. 7 is a flowchart illustrating a method by which a master device sends a read command to a slave device in accordance with one embodiment.

Referring to FIG. 7, a flowchart illustrating a method by which a master device sends a read command to a slave device in accordance with one embodiment is shown. Processing begins at 700 whereupon, at block 710, the master device generates a read command. A master device uses a read command, which includes a destination address, to transfer data from a slave device's local storage to the local storage of the master device. At block 715, an m-tag is obtained from a list containing information that indicates which of the m-tags are available. The m-tag is an index into a command buffer where the command is stored while the associated transaction is being processed. The command is removed from the buffer when the associated transaction is complete. At block 720, the command is stored in the command buffer using the m-tag value as an index, and at block 725, the command and the selected m-tag are sent to the slave device from which the data is to be read. Prior to requesting data, a master device determines whether the slave device is available to send the data.

At block 730, the slave device receives the m-tag and the read command sent by the master device. The slave device is configured to determine whether the slave device's read buffer is full at decision 735. If the buffer is full, decision 735 branches to the "yes" branch whereupon, at block 740, the slave device sends to the master a retry response that also includes the received m-tag. The master device can use the m-tag to associate the received response to the previously sent command so that the master device can resend the command at a later time. The slave device sends the retry response to indicate to the master device that the slave device is not currently available to accept the command sent by the master device.

On the other hand, if the slave device's read buffer is not full, decision 735 branches to the "no" branch whereupon, at block 750, the received command, which includes the address from which data is to be read, is stored in the read buffer with the m-tag. The address contained in the command is the address where the slave device stores the data in the slave device's local storage. After the slave device successfully receives the read command from the master device, the slave device, at block 755, sends an acknowledgment response to the master device. In one embodiment, the acknowledgment response includes the received m-tag. The m-tag is used by the master device to associate the response sent by the slave device to the previously sent read command.

Figure 8:
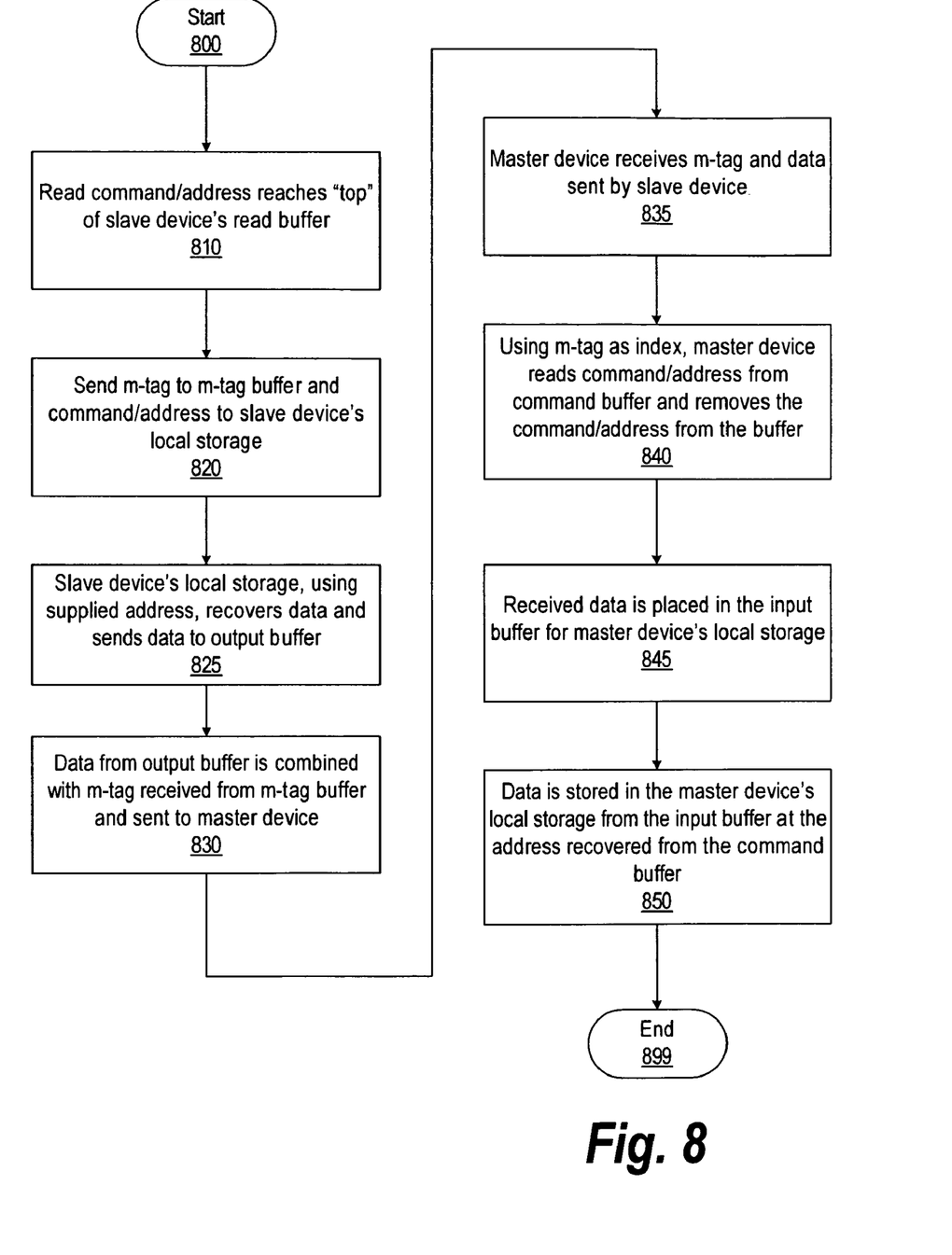
FIG. 8 is a flowchart illustrating a method by which a slave device sends data to a master device in response to a read command in accordance with one embodiment.

Referring to FIG. 8, a flowchart illustrating a method by which a slave device sends data to a master device in response to a read command in accordance with one embodiment is shown. Processing begins at 800 whereupon, at block 810, the previously stored read command reaches the "top" of the read command buffer. At block 820, the slave device stores the m-tag in an m-tag buffer and the recovered command/address is sent to the slave device's local storage so that the data to be sent to the master device is read. At block 825, the data read from the local storage is sent to output data buffer, and at block 830, the data is sent together with the corresponding m-tag from the m-tag buffer to the master device.

At block 835, the master device receives the data sent by the slave device and the m-tag that the master device had previously sent to the slave with the read command. At block 840, the m-tag is used as an index to the master device's command buffer to locate the command corresponding to the received data. When the command is located, the command is removed from the buffer and the address stored with the command is sent to the master device's local storage so that the received data can be stored at that address at block 840. At block 845, the received data is sent to an input buffer, and at block 850, the data from the input buffer is stored at the recovered address in the master device's local storage. At 899, the process of reading data from the slave device to the master device is completed.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To illustrate this interchangeability of hardware and software clearly, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method implemented in a system having one or more master devices and one or more slave devices coupled to a bus, the method comprising:
    a master device generating a write command;
    the master device assigning a first tag value to the command
    the master device storing the command in a first buffer in the master device at a location for which the first tag value is an index value;
    the master device transferring the command and the first tag to a first slave device;
    the first slave device receiving the command;
    the first slave device assigning a second tag value to the command; and
    the first slave device storing the command in a second buffer in the first slave device at a location for which the second tag value is an index value.

2. The method of claim 1, further comprising the first slave transmitting a reply to the command to the master device, wherein the reply includes the first tag value and the second tag value.

3. The method of claim 2, wherein the first tag value includes an identifier of the master device and the second tag value includes an identifier of the slave device.

4. The method of claim 2, further comprising one or more additional slave devices transmitting replies to the command to the master device.

5. The method of claim 4, further comprising combining the replies of the one or more additional slave devices into a single combined reply and transmitting the combined reply to the master device, the first slave device and the one or more additional slave devices, wherein the combined reply includes the first tag value and the second tag value.

6. The method of claim 5, wherein when the combined reply comprises a retry reply, the slave device is configured to clear the command in the second buffer at the index of the second tag value.

7. The method of claim 1, further comprising the master device transmitting write data to the slave device with the second tag value.

8. The method of claim 7, further comprising the slave device receiving the write data, determining the second tag value transmitted with the write data, retrieving the command indexed at the second tag value from the second buffer, and storing the write data at a location indicated by the retrieved command.

9. A system comprising:
    one or more slave devices,
        wherein each slave device includes a processor and a slave command buffer, and
        wherein the processor is configured to receive a write command, and
            when there are one or more available locations in the command buffer,
                store the write command in one of the available locations,
                assign a slave tag value to the command, wherein the slave tag value comprises an index to the location in the command buffer in which the command is stored, and
                transmit a reply to the command, wherein the reply includes an acknowledgment and the slave tag value.

10. The system of claim 9, further comprising one or more master devices and a bus coupled to the master and slave devices, wherein each of the master devices is configured to:
    assign a master tag value to the write command;
    store the write command in a master command buffer at a location for which the master tag value is an index value;
    transmit the write command and the master tag value to a first one of the slave devices via the bus;
    receive a reply to the write command, wherein the reply includes the master tag value and a slave tag value assigned to the write command by the first slave device;
    retrieve the write command from the master command buffer using the master tag value;
    retrieve write data indicated by the write command; and
    transmit the write data to the first slave device with the slave tag value.

11. The system of claim 10, wherein each of the master devices is further configured to clear the write command from the master command buffer after transmitting the write data to the first slave device with the slave tag value.

12. The system of claim 10, wherein each of the master devices is further configured to retransmit the write data to the first slave device with the slave tag value when a retry reply associated with the write command is received.

13. The system of claim 9, wherein the processor is configured to store the command with a master tag value that is received with the command.

14. The system of claim 9, wherein, when the processor receives the write command and there are no available locations in the command buffer, the processor is configured to reply to the command with a retry reply.

15. The system of claim 9, wherein the processor is configured to receive write data after receiving the write command, wherein the write data includes the slave tag value and wherein, upon receiving the write data with the slave tag value, the processor is configured to use the slave tag value to index into the command buffer to retrieve the write command and to store the write data in a local storage at an address indicated by the write command.

16. The system of claim 9, wherein the processor is configured to clear the write command from the slave buffer when a retry combined reply associated with the write command is received.

17. A master device comprising:
a processor; and
a command buffer;
wherein the processor is configured to
receive a reply to a write command, wherein the reply includes a master tag value assigned to the command by the processor and a slave tag value assigned to the command by a slave device,
retrieve the command from the command buffer using the master tag value,
retrieve write data indicated by the write command, and
transmit the write data to the slave device with the slave tag value.

18. A bus agent comprising:
a processor;
a master command buffer; and
a slave command buffer;
wherein the bus agent is configured to act as either a master or a slave in a write transaction;
wherein when the bus agent acts as a master, the processor is configured to
assign a master tag value to a write command,
store the write command in a master command buffer at a location for which the master tag value is an index value,
transmit the write command and the master tag value to a first one of the slave devices via the bus,
receive a reply to the write command, wherein the reply includes the master tag value and a slave tag value assigned to the write command by the first slave device,
retrieve the write command from the master command buffer using the master tag value,
retrieve write data indicated by the write command, and
transmit the write data to the first slave device with the slave tag value; and
wherein when the bus agent acts as a slave, the processor is configured to
receive the write command and the master tag value, and
when there are one or more available locations in a corresponding slave command buffer,
store the write command in one of the available locations,
assign the slave tag value to the write command, wherein the slave tag value comprises an index to the location in the slave command buffer in which the write command is stored, and
transmit the reply to the write command including an acknowledgment, the master tag value and the slave tag value.

19. The bus agent of claim 18, wherein the processor is further configured to include an identifier in each m-tag and each s-tag identifying whether associated information is to be processed by the bus agent acting as a master or as a slave.

* * * * *